United States Patent
Borrel et al.

(10) Patent No.: US 11,193,182 B2
(45) Date of Patent: Dec. 7, 2021

(54) METHOD AND FURNACE INSTALLATION FOR HEAT TREATING METAL STRIP

(71) Applicant: ANDRITZ Technology and Asset Management GmbH, Graz (AT)

(72) Inventors: Pierre-Jerome Borrel, Montreuil (FR); Eric Blake, Sewickley, PA (US)

(73) Assignee: Andritz Technology and Asset Management GmbH, Graz (AT)

( * ) Notice: Subject to any disclaimer, the term of this patent is extended or adjusted under 35 U.S.C. 154(b) by 393 days.

(21) Appl. No.: 16/092,982

(22) PCT Filed: Mar. 22, 2017

(86) PCT No.: PCT/EP2017/056756
§ 371 (c)(1),
(2) Date: Oct. 11, 2018

(87) PCT Pub. No.: WO2017/178200
PCT Pub. Date: Oct. 19, 2017

(65) Prior Publication Data
US 2019/0119777 A1    Apr. 25, 2019

(30) Foreign Application Priority Data

Apr. 15, 2016 (AT) .............................. A 50332/2016

(51) Int. Cl.
*C21D 9/60* (2006.01)
*C21D 1/74* (2006.01)
(Continued)

(52) U.S. Cl.
CPC ................. *C21D 9/60* (2013.01); *C21D 1/42* (2013.01); *C21D 1/74* (2013.01); *C21D 9/561* (2013.01);
(Continued)

(58) Field of Classification Search
CPC . C21D 1/42; C21D 1/74; C21D 9/561; C21D 9/60; F27B 9/047; F27B 9/067;
(Continued)

(56) References Cited

U.S. PATENT DOCUMENTS 5,472,528 A    12/1995  Boyer
5,770,838 A    6/1998   Rohrbaugh et al.

FOREIGN PATENT DOCUMENTS

| EP | 2133436 A1 | 12/2009 |
|----|------------|---------|
| JP | 2007092140 A * | 4/2007 |
| WO | 2006000011 A2 | 1/2006 |

OTHER PUBLICATIONS

Internation Search Report dated Jun. 2, 2017 (PCT/EP2017/056756).

* cited by examiner

*Primary Examiner* — Jie Yang
(74) *Attorney, Agent, or Firm* — Alix, Yale & Ristas, LLP

(57) ABSTRACT

A method for heat-treating a metal strip, where the metal strip is pre-heated continuously in a pre-heating zone with the aid of hot gas and subsequently undergoes further heat treatment in a directly fired furnace in a reducing and/or oxidizing atmosphere. The metal strip is pre-heated in the pre-heating zone with hot inert gas and further heated with an electric heating system before entering the directly fired furnace. A furnace plant for implementing the process and a related heat recovery system are also disclosed.

17 Claims, 2 Drawing Sheets

(51) Int. Cl.
  *C21D 9/56*    (2006.01)
  *F27B 9/04*    (2006.01)
  *F27B 9/12*    (2006.01)
  *F27B 9/06*    (2006.01)
  *F27B 9/28*    (2006.01)
  *F27B 9/36*    (2006.01)
  *F27D 17/00*   (2006.01)
  *C21D 1/42*    (2006.01)

(52) U.S. Cl.
  CPC .............. *F27B 9/047* (2013.01); *F27B 9/067* (2013.01); *F27B 9/12* (2013.01); *F27B 9/28* (2013.01); *F27B 9/36* (2013.01); *F27D 17/004* (2013.01); *Y02P 10/25* (2015.11)

(58) Field of Classification Search
  CPC ...... F27B 9/12; F27B 9/28; F27B 9/36; F27D 17/004; Y02P 10/25
  USPC ......................................................... 148/425
  See application file for complete search history.

METHOD AND FURNACE INSTALLATION FOR HEAT TREATING METAL STRIP

BACKGROUND

The present invention concerns a method for heat-treating a metal strip, where the metal strip is pre-heated in a pre-heating zone with the aid of hot gas and subsequently undergoes further heat treatment in a directly fired furnace in a reducing and/or oxidizing atmosphere. A furnace plant for implementing the process according to the invention is also the subject of the present invention.

A metal strip is often heat-treated in this way before galvanizing or also in annealing furnaces after a pickling line.

U.S. Pat. No. 5,770,838 discloses a furnace for heat-treating a metal strip, with a pre-heating zone, an induction heating system, and a subsequent heating zone.

One heat treatment method is to use directly fired furnaces (DFF), where the burners are located directly inside the furnace.

With these furnaces, there is a pre-heating zone in which the metal strip running continuously through the furnace is pre-heated to approximately 200-300° C. with the aid of the hot exhaust gases from the directly fired furnace. Before undergoing heat treatment, the metal strip is covered with a layer of oxide caused, for example, by the rinsing water from the pickling section. This oxide layer comprises primarily $Fe_2O_3$ (ferric oxide, hematite) and $Fe_3O_4$ (magnetite).

In the pre-heating zone, this oxide layer continues to build up because there is still oxygen and water vapour in the exhaust gases from the directly fired furnace. However, this oxide is detrimental because it hampers the diffusion of oxygen into the basic material during subsequent internal oxidation in the directly fired furnace. Oxygen diffusion into the basic material enables the formation of silicon oxide that serves as a diffusion barrier for the silicon, which is an advantage.

Thus, according to the state of the art, the metal strip is exposed subsequently to a reducing atmosphere in the directly fired furnace. For this purpose, the burners are operated with surplus fuel, i.e. under an air and oxygen deficiency, with the result that the combustion products have a high content of CO and $H_2$ and thus have a reducing effect. This means that the detrimental ferric oxide layer is broken down.

After this, the metal strip is exposed to an oxidizing atmosphere at high temperatures at the end of the directly fired furnace, resulting in internal oxidation of the alloying elements like silicon or manganese. In addition, FeO (wustite) is formed.

However, in conventional, directly fired furnaces and at high production rates, the time remaining for internal oxidation is rather short, and this can have a negative effect on the product quality.

SUMMARY

The inventive embodiments disclosed herein provide a method for heat treatment of metal strips in which the reactions in the directly fired furnace are improved, particularly the internal oxidation of silicon and manganese in the basic material.

According to an embodiment of the invention, the metal strip is pre-heated in the pre-heating zone with hot inert gas and then further heated in addition with an electric heating system, preferable induction heating, before entering the directly fired furnace (DFF). The heat in the hot gases from the directly fired furnace is used here to pre-heat the inert gas for the pre-heating zone.

By pre-heating the metal strip in an inert gas atmosphere, formation of an undesirable oxide layer is prevented and the temperature of the metal strip when it enters the furnace can be increased substantially, preferably to more than 500° C., by the electric heating system upstream of the directly fired furnace. As a result of the higher inlet temperature of the metal strip, there is more time available for the chemical reactions in the directly fired furnace, such as reduction or oxidation.

In particular, internal oxidation of the basic material of the metal strip can be controlled better and performed more efficiently as a result.

The metal strip is preferably pre-heated to more than 200° C., preferably to up to 300° C., in the pre-heating zone with the aid of hot nitrogen. Then the metal strip is heated further by the electric heating system to more than 350° C., preferably more than 500° C.

It is favourable if the electric heating system heats the metal strip in an inert gas atmosphere, preferably a nitrogen atmosphere. However, it is also conceivable that the electric heating system heats the metal strip in a slightly reducing atmosphere, preferably in a nitrogen atmosphere containing 2-3% hydrogen.

The heat in the exhaust gases can also be used to pre-heat the combustion air for burners in the directly fired furnace.

A furnace plant for implementing the method is also disclosed herein.

This furnace plant has a pre-heating zone in which the metal strip is pre-heated with the aid of hot gas and a subsequent, directly fired furnace for further heat treatment of the metal strip. According to the invention, the hot gas is an inert gas, preferably nitrogen, and an electric heating system to increase the temperature of the metal strip further is located in addition after the pre-heating zone and before the directly fired furnace. The exhaust gases from the directly fired furnace heat the gas for pre-heating via a heat exchanger.

It is favourable if the electric heating is an induction heating system and if there is an inert gas atmosphere inside the electric heating system.

BRIEF DESCRIPTION OF THE DRAWINGS

In the following, an embodiment of the invention is described on the basis of two drawings. In these drawings.

DETAILED DESCRIPTION

Figure 1:
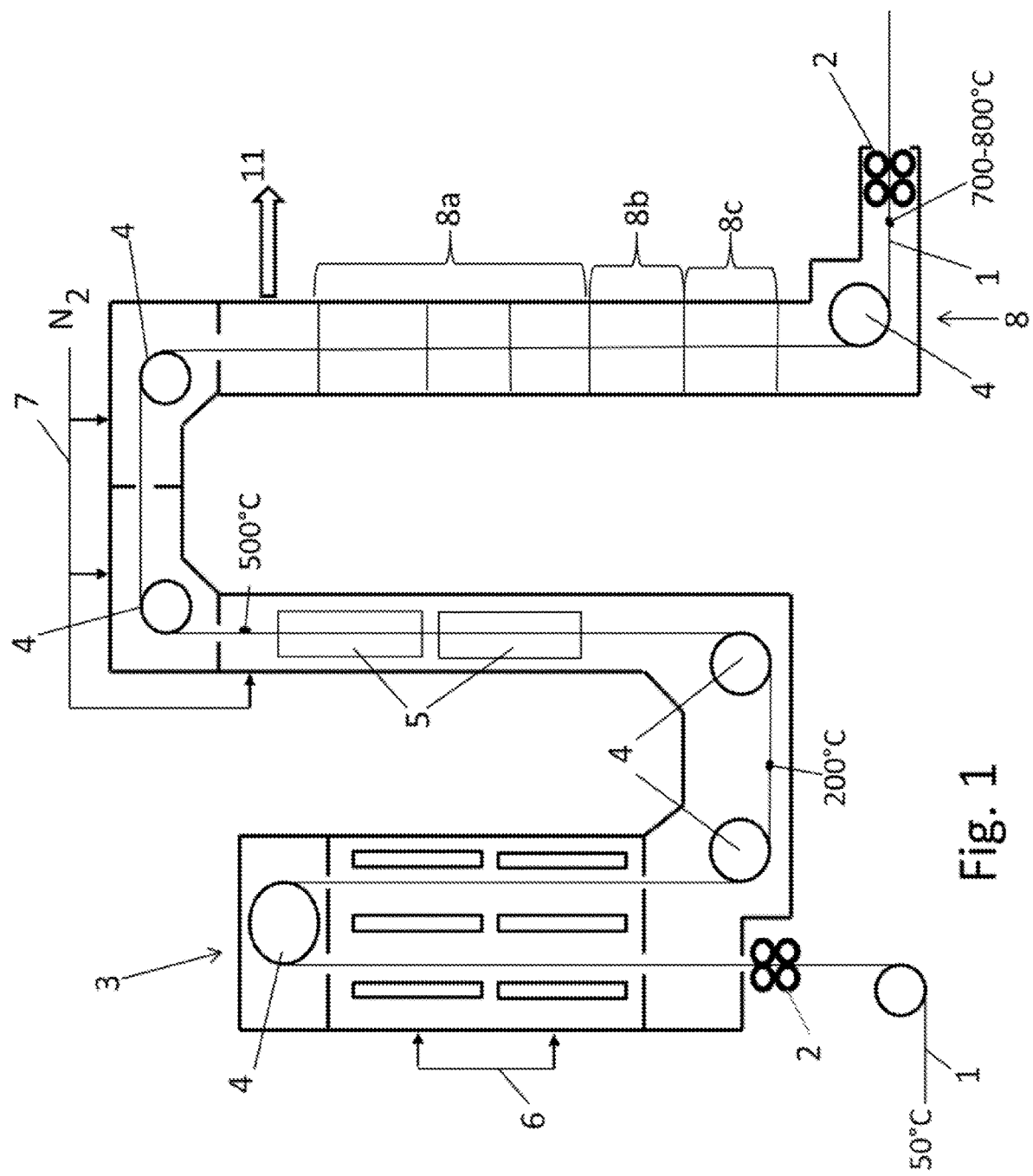
FIG. 1 shows a schematic arrangement of the furnace plant.

The same reference numerals in the two figures refer to the same components or material flows in each case.

In FIG. 1, the metal strip 1 runs continuously at an inlet temperature of approximately 50° C. over a pair of sealing rolls 2 into the pre-heating zone 3 of the furnace plant and is heated there to approximately 200° C. with the aid of hot nitrogen 6. In the pre-heating zone 3, hot nitrogen 6 is blown through nozzles directly onto the metal strip 1. Deflector rolls 4 guide the metal strip 1 through the furnace plant.

Following the pre-heating zone 3, the metal strip 1 is heated further to approximately 500° C. in an inert gas atmosphere with the aid of an electric induction heating system 5. Nitrogen is also fed into this area through the pipe 7. Then the metal strip enters the directly fired furnace 8 and is further heated there in the initial area 8*a* before being freed of the oxide layer in the reducing zone 8*b* at approximately 720° C. Immediately after this, the bright metal strip 1 is exposed to an oxidizing atmosphere 8*c* at approximately 760° C. in which internal oxidation processes take place preferably in the basic material, where silicon oxide is formed. After this, the metal strip leaves the furnace plant via the sealing roll pair 2 and is then fed to a galvanizing plant, for example after further heat treatment and cooling.

Figure 2:
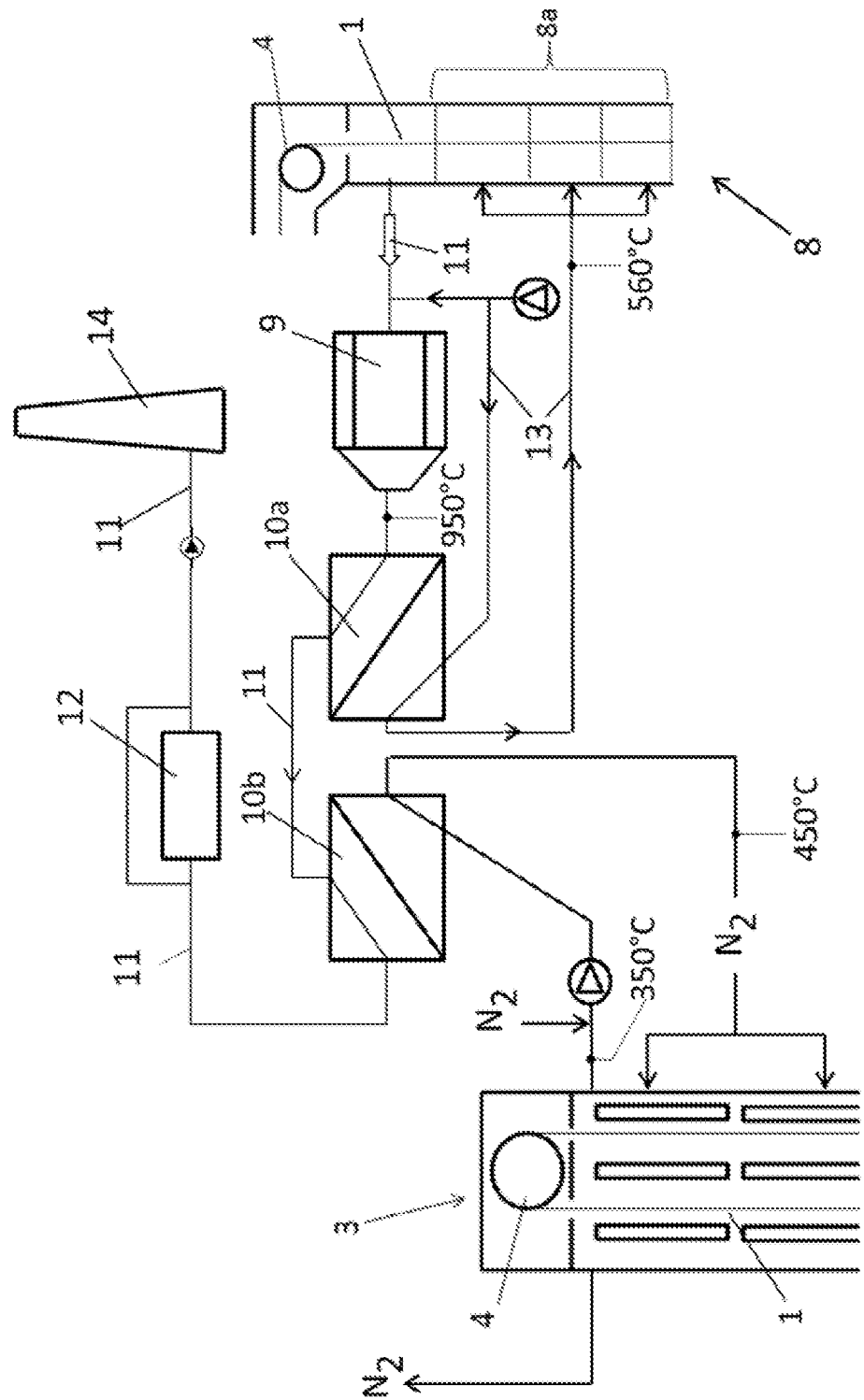
FIG. 2 shows a schematic arrangement of the heat recovery system of the furnace plant.

FIG. 2 shows a schematic of a heat recovery system in the furnace plant in FIG. 1. The hot, waste gases 11 from the directly fired furnace 8 are enriched here with combustion air 13 and fed to a post-combustion plant 9. In the two heat exchangers 10*a* and 10*b* and in the boiler 12, heat is extracted from the hot, exhaust gases 11 before they are discharged through the chimney 14. Of course, a suitable exhaust gas cleaning process can be implemented beforehand.

In the first heat exchanger 10*a*, the combustion air 13 for the furnace 8 burners is heated to approximately 560° C. by the hot exhaust gas, which has a temperature of approximately 950° C. In the second heat exchanger 10*b*, the nitrogen from the pre-heating zone is heated again from approximately 350° C. to approximately 450° C. and then returned to the pre-heating zone in order to heat the metal strip 1.

As the surface of the metal strip 1 is wet in places from water or hydrocarbons when it enters the pre-heating zone 3, water vapour and hydrocarbons would gather in the pre-heating zone 3 if the nitrogen loop were closed. In order to avoid this, some of the nitrogen is removed from the pre-heating zone 3 and replaced by fresh nitrogen, as illustrated by the two arrows in FIG. 2.

The invention claimed is:

1. A method for treating a metal strip (1), comprising:
   (a) pre-heating the metal strip (1) with a hot inert gas (6) in a pre-heating zone (3) to reach a pre-heated metal strip;
   (b) further heating the pre-heated metal strip after step (a) in a directly fired furnace (8) in one or more of a reducing atmosphere and an oxidizing atmosphere, the directly fired furnace (8) generating exhaust gases (11), wherein
   the metal strip (1) is further heated by an electric heating system (5) after step (a) of pre-heating with inert gas (6) and before entering the directly heated furnace (8) in step (b), and
   heat in the exhaust gases (11) from the directly fired furnace (8) is used to pre-heat the inert gas (6) for use within the pre-heating zone (3).

2. The method of claim 1, wherein the electric heating system is an induction heating system.

3. The method of claim 1, wherein the metal strip (1) is heated to more than 200° C. in the inert gas atmosphere in the pre-heating zone (3).

4. The method of claim 3, wherein the metal strip (1) is heated to up to approximately 300° C. in the inert gas atmosphere in the pre-heating zone (3).

5. The method of claim 3, wherein the metal strip (1) is heated to more than approximately 350° C. by the electric heating system.

6. The method of claim 5, wherein the metal strip (1) is heated to more than approximately 500° C. by the electric heating system.

7. The method of claim 1, wherein the electric heating system (5) heats the metal strip (1) in an inert gas atmosphere.

8. The method of claim 7, wherein the inert gas atmosphere is a nitrogen atmosphere.

9. The method of claim 7, wherein heat in the exhaust gases (11) from the directly fired furnace (8) is used to pre-heat the combustion air (13) for the burners in the directly fired furnace (8).

10. The method of claim 1, wherein the electric heating system (5) heats the metal strip (1) in a reducing atmosphere.

11. The method of claim 10, wherein the reducing atmosphere is a nitrogen atmosphere containing 2-3% hydrogen.

12. The method of claim 10, wherein heat in the exhaust gases (11) from the directly fired furnace (8) is used to pre-heat the combustion air (13) for the burners in the directly fired furnace (8).

13. The method of claim 1, wherein heat in the exhaust gases (11) from the directly fired furnace (8) is used to pre-heat the combustion air (13) for the burners in the directly fired furnace (8).

14. A method of treating a metal strip (1), comprising:
   (i) conveying the metal strip (1) to a pre-heating zone (3) within which the metal strip (1) is pre-heated to above 200° C. with a hot inert gas (6), thereby forming a pre-heated metal strip;
   (ii) conveying the pre-heated metal strip through an electric heating system (5) positioned downstream of pre-heating zone (3) for further heat treatment in either an inert gas atmosphere or a reducing atmosphere of an inert gas with hydrogen to more than approximately 350° C., thereby forming an electrically heated metal strip; and
   (iii) feeding the electrically heated metal strip through a directly fired furnace (8) positioned downstream of the electric heating system (5) for treatment in one or more of a reducing atmosphere and an oxidizing atmosphere, the directly fired furnace (8) generating exhaust gases (11), wherein
   heat in the exhaust gases (11) from the directly fired furnace (8) is used to pre-heat the inert gas (6) for use in the pre-heating zone (3).

15. The method of claim 14, wherein the electric heating system heats the pre-heated metal strip in a reducing atmosphere of nitrogen with approximately 2-3% hydrogen.

16. The method of claim 14, wherein the electric heating system heats the pre-heated metal strip via induction to more than 500° C.

17. The method of claim 14, wherein heat in the exhaust gases (11) from the directly fired furnace (8) is used to pre-heat the combustion air (13) for the burners in the directly fired furnace (8).

* * * * *